United States Patent [19]
Bertram et al.

[11] Patent Number: 4,594,291
[45] Date of Patent: Jun. 10, 1986

[54] CURABLE, PARTIALLY ADVANCED EPOXY RESINS

[75] Inventors: James L. Bertram, Lake Jackson; Louis L. Walker, Clute; Jody R. Berman; James A. Clarke, both of Lake Jackson, all of Tex.

[73] Assignee: The Dow Chemical Company, Midland, Mich.

[21] Appl. No.: 716,279

[22] Filed: Mar. 25, 1985

Related U.S. Application Data

[63] Continuation-in-part of Ser. No. 631,676, Jul. 17, 1984, abandoned.

[51] Int. Cl.⁴ .................. C08G 59/62; C08G 59/14
[52] U.S. Cl. ................................ 428/414; 523/400; 525/485; 525/486; 528/89; 528/93; 528/97; 528/98; 528/104; 528/109; 528/110; 528/111; 528/112; 528/113; 528/122; 528/123; 528/124; 528/361; 528/365; 528/407
[58] Field of Search ............... 525/485, 486; 528/89, 528/93, 97, 98, 104, 109, 110, 111, 112, 113, 122, 123, 124, 361, 365, 407; 428/414; 523/400

[56] References Cited

U.S. PATENT DOCUMENTS

| | | | |
|---|---|---|---|
| 3,687,894 | 9/1972 | Collings et al. | 528/104 X |
| 3,725,341 | 4/1973 | Rogers et al. | 528/104 X |
| 3,738,862 | 6/1973 | Klarquist et al. | 528/104 X |
| 3,919,169 | 11/1975 | Ramsey et al. | 528/89 X |
| 4,026,862 | 5/1977 | Smith et al. | 528/89 X |
| 4,320,222 | 3/1982 | Lopez | 528/104 X |
| 4,358,578 | 11/1982 | Brownscombe | 528/89 X |

*Primary Examiner*—Earl Nielsen
*Attorney, Agent, or Firm*—J. G. Carter

[57] ABSTRACT

Relatively high molecular weight epoxy resins cured with conventional curing agents are disclosed wherein the relatively high molecular weight epoxy resin is prepared in the presence of the curing agents. The resultant cured epoxy resin has an improvement in Tg or toughness and the mixture prior to reaction and curing is much easier to apply as a coating or in the preparation of castings, laminates and the like as compared to applications of mixtures of relatively high molecular weight epoxy resins and the curing agents.

94 Claims, No Drawings

CURABLE, PARTIALLY ADVANCED EPOXY RESINS

CROSS REFERENCE TO RELATED APPLICATIONS

This is a continuation-in-part of application Ser. No. 631,676 filed July 17, 1984, now abandoned.

BACKGROUND OF THE INVENTION

The present invention concerns relatively high molecular weight epoxy resins cured with conventional curing agents wherein the relatively high molecular weight epoxy resin is prepared in situ in the presence of the curing agents.

Lee and Neville in *HANDBOOK OF EPOXY RESINS*, McGraw-Hill, 1967 have disclosed products obtained by curing advanced epoxy resins.

While these cured products have good properties, application of the mixtures of epoxy resins and the curing agent are very difficult in that they are highly viscous, are difficult to devolatilize and at a temperature sufficiently high to achieve a suitable viscosity, the working time or pot life is relatively short.

The present invention provides a method for easier application in the form of lower application viscosities, thus allowing lower application temperatures and extended working time or pot life and an improvement in one or more of the properties of the cured product such as glass transition temperature (Tg), fracture toughness ($G_{IC}$), impact, flexural modulus, percent elongation, and the like.

SUMMARY OF THE INVENTION

One aspect of the present invention pertains to partially advanced epoxy resin compositions comprising a product resulting from reacting a composition comprising (A) at least one relatively low equivalent weight epoxy resin having an average of more than one vicinal epoxy group per molecule;

(B) at least one extender material having an average of about two active hydrogen atoms per molecule which are reactive with vicinal epoxy groups;

(C)
  (1) optionally, one or more catalysts for promoting the reaction between components (A) and (B);
  (2) one or more epoxy resin curing agents; or
  (3) a combination of (1) and (2); and (D) one or more stabilizer materials wherein (i) components (A), (B), (C) and (D) are present in quantities which provide from about 0.1 to about 0.9, preferably from about 0.15 to about 0.85, most preferably from about 0.25 to about 0.75, active hydrogen equivalent in component (B) per epoxide equivalent in component (A); from about 0.05 to about 0.9, preferably from about 0.05 to about 0.75, most preferably from about 0.075 to about 0.75, equivalent of component (C2) per epoxide equivalent in component (A) and the combined equivalents of components (B) and (C2) per epoxide equivalent in component (A) is from about 0.15:1 to about 1.1:1, preferably from about 0.2:1 to about 1.05:1, most preferably from about 0.325:1 to about 1:1; from about zero to about 0.1, preferably from about 0.00005 to about 0.05, most preferably from about 0.0001 to about 0.03, mole of component (C1) per epoxide equivalent in component (A); and component (D) is present in a quantity which is sufficient to reduce the viscosity increase of the resultant partially advanced epoxy resin composition during storage, preferably from about 0.0001 to about 0.01, most preferably from about 0.0005 to about 0.005 mole per epoxide equivalent in component (A); and (ii) the composition is partially advanced to the extent that the melt viscosity has increased to a value which is at least about 20, preferably from about 25 to about 625, most preferably from about 50 to about 300, percent greater than the melt viscosity of the initial mixture of components (A), (B), (C) and (D) with the proviso that said partially advanced composition is melt flowable at or below about 250° C. and if said increase in melt viscosity is at least about 1250 percent, a solvent is required.

Another aspect of the present invention pertains to products resulting from reacting and curing a composition comprising a mixture of (I) a partially advanced epoxy resin of claims 1, 2, 3, 4 or 5;

(II) at least one curing agent therefor; and (III) optionally, a catalytic quantity of one or more catalysts for effecting the reaction between components (IA) and (IB); and wherein the components are employed in an equivalent ratio of (IA):(IB):(IC2+II) of from about 1:0.1:0.5 to about 1:0.9:0.2, preferably from about 1:0.15:0.7, most preferably from about 1:0.25:0.65; the combined equivalents of components (IB), (IC2) and (II) per epoxide equivalent in component (IA) is from about 0.6:1 to about 1.1:1, preferably from about 0.85:1 to about 1.05:1, most preferably most preferably from about 0.9:1 to about 1.05:1, and the combined quantity of components (IC1) and (III) is that which provides from about zero to about 0.2, preferably from about 0.0001 to about 0.1, most preferably from about 0.0005 to about 0.05, mole of catalyst per epoxide equivalent in component (IA).

Another aspect of the present invention pertains to laminating varnishes comprising a mixture of (I) a partially advanced epoxy resin of claims 1, 2, 3, 4 or 5;

(II) at least one curing agent therefor; and (III) optionally, a catalytic quantity of one or more catalytsts for effecting the reaction between components (I-A) and (I-B); and (IV) optionally, one or more solvents in a quantity sufficient to provide a suitable application viscosity; and wherein the components are employed in an equivalent ratio of (IA):(IB):(IC2+II) of from about 1:0.1:0.5 to about 1:0.9:0.2, preferably from about 1:0.15:0.7 to about 1:0.85:0.2, most preferably from about 1:0.25:0.65 to about 1:0.75:0.3; the combined equivalents of components (IB), (IC2) and (II) per epoxide equivalent in component (IA) is from about 0.6:1 to about 1.1:1, most preferably from about 0.85:1 to about 1.05:1, most preferably from about 0.9:1 to about 1.05:1 and the combined quantity of components (IC1) and (III) is that which provides from about zero to about 0.2, preferably from about 0.0001 to about 0.1, most preferably from about 0.0005 to about 0.05, mole of catalyst per epoxide equivalent in component (IA).

Another aspect of the present invention pertains to solvent free, partially advanced, epoxy resin compositions comprising a product resulting from reacting a composition comprising (A) at least one relatively low equivalent weight epoxy resin having an average of more than one vicinal epoxy group per molecule;

(B) at least one extender material having an average of about two active hydrogen atoms per molecule which are reactive with vicinal epoxy groups;

(C)
  (1) optionally, one or more catalysts for promoting the reaction between components (A) and (B);
  (2) one or more epoxy resin curing agents; or
  (3) a combination of (1) and (2); and (D) optionally, one or more stabilizer materials; wherein (i) components (A), (B), (C) and (D) are present in quantities which provide from about 0.1 to about 0.9, preferably from about 0.15 to about 0.85, most preferably from about 0.25 to about 0.75, active hydrogen equivalent in component (B) per epoxide equivalent in component (A); from about 0.05 to about 0.9, preferably from about 0.05 to about 0.75, most preferably from about 0.075 to about 0.75, equivalent of component (C2) per epoxide equivalent in component (A) and the combined equivalents of components (B) and (C2) per epoxide equivalent in component (A) is from about 0.15:1 to about 1.1:1, preferably from about 0.2:1 to about 1.05:1, most preferably from about 0.325:1 to about 1:1; from about zero to about 0.1, preferably from about 0.00005 to about 0.05, most preferably from about 0.0001 to about 0.03, mole of component (C1) per epoxide equivalent in component (A); and component (D), when present, is present in a quantity which is sufficient to reduce the viscosity increase of the resultant partially advanced epoxy resin composition during storage, preferably from about 0.001 to about 0.01 mole of component (D) per epoxide group in component (A); and (ii) the composition is partially advanced to the extent that the melt viscosity has increased to a value which is greater than about 1250 percent greater than the melt viscosity of the initial mixture of components (A), (B), (C) and (D).

Another aspect of the present invention pertains to powder coating compositions comprising (I) a solvent free, partially advanced, epsoy resin of claims 36, 37, 38, 39 or 40;
(II) at least one curing agent therefor; and
(III) optionally, a catalytic quantity of one or more catalysts for effecting the reaction between components (IA) and (IB); and wherein the components are employed in an equivalent ratio of (IA):(IC2+II) of from about 1:0.1:0.5 to about 1:0.9:0.2, preferably from about 1:0.15:0.7, most preferably from about 1:0.25:0.65 to about 1:0.75:0.3; the combined equivalents of components (IB), (IC2) and (II) per epoxide equivalent in component (IA) is from about 0.6:1 to about 1.1:1, preferably from about 0.85:1 to about 1.05:1, most preferably from about 0.9:1 to about 1.05:1 and the combined quantity of components (IC1) and (III) is that which provides from about zero to about 0.2, preferably from about 0.0001 to about 0.1, most preferably from about 0.0005 to about 0.05, mole of catalyst per epoxide equivalent in component (IA).

Another aspect of the present invention pertains to partially advanced epoxy resin compositions comprising a product resulting from reacting a composition comprising (A) at least one relatively low equivalent weight epoxy resin having an average of more than one vicinal epoxy group per molecule;

(B) at least one extender material having an average of about two active hydrogen atoms per molecule which are reactive with vicinal epoxy groups;

(C)
  (1) optionally, one or more catalysts for promoting the reaction between components (A) and (B);
  (2) one or more epoxy resin curing agents; or
  (3) a combination of (1) and (2); and (D) one or more solvents wherein (i) components (A), (B), (C) and (D) are present in quantities which provide from about 0.1 to about 0.9, preferably from about 0.15 to about 0.85, most preferably from about 0.25 to about 0.75, active hydrogen equivalent in component (B) per epoxide equivalent in component (A); from about 0.05 to about 0.9, preferably from about 0.05 to about 0.75, most preferably from about 0.075 to about 0.75, equivalent of component (C2) per epoxide equivalent in component (A) and the combined equivalents of components (B) and (C2) per epoxide equivalent in component (A) is from about 0.15:1 to about 1.1:1, preferably from about 0.2:1 to about 1.05:1, most preferably from about 0.325:1 to about 1:1; from about zero to about 0.1, preferably from about 0.00005 to about 0.05, most preferably from about 0.0001 to about 0.03, mole of component (C1) per epoxide equivalent in component (A); and component (D) is present in a quantity of from about 5 to about 90, suitably from about 10 to about 40 or 40 to about 80 percent by weight of the combined weight of components (A), (B), (C) and (D); and (ii) the composition is partially advanced to the extent that the melt viscosity of reacted components (A), (B) and (C) has increased to a value which is at least about 20 percent greater than the melt viscosity of the initial mixture of components (A), (B) and (C), preferably the melt viscosity has increased to a value of from about 100 to about 500, most preferably from about 120 to about 300 centipoise measured at 100° C.; with the proviso that said partially advanced composition is soluble in component (D).

Another aspect of the present invention pertains to solvent free, partially advanced, epoxy resin compositions comprising a product resulting from reacting a composition comprising (A) at least one relatively low equivalent weight epoxy resin having an average of more than one vicinal epoxy group per molecule;

(B) at least one extender material having an average of about two active hydrogen atoms per molecule which are reactive with vicinal epoxy groups;

(C)
  (1) optionally, one or more catalysts for promoting the reaction between components (A) and (B);
  (2) one or more epoxy resin curing agents; or
  (3) a combination of (1) and (2); and (D) optionally, one or more stabilizer materials; wherein (i) components (A), (B), (C) and (D) are present in quantities which provide from about 0.1 to about 0.9, preferably from about 0.15 to about 0.85, most preferably from about 0.25 to about 0.75, active hydrogen equivalent in component (B) per epoxide equivalent in component (A); from about 0.05 to about 0.9, preferably from about 0.05 to about 0.75, most preferably from about 0.075 to about 0.75, equivalent of component (C2) per epoxide equivalent in component (A) and the combined equivalents of components (B) and (C2) per epoxide equivalent in component (A) is from about 0.15:1 to about 1.1:1, preferably from about 0.2:1 to about 1.05:1, most preferably from about 0.325:1 to about 1:1; from about zero to about 0.1, preferably from about 0.00005 to about 0.05, most preferably from about 0.0001 to about 0.03, mole of component (C1) per epoxide equivalent in component (A); and component (D), when present, is present in a quantity which is sufficient to reduce the viscosity increase of the resultant partially advanced epoxy resin composition during storage, preferably from about 0.001 to about 0.01 mole of component (D) per epoxide group in component (A); and (ii) the composition is partially advanced to the extent that the melt viscosity has increased to a value which is from about 20 to about 1250, preferably from about 25 to about 625, most preferably from about 50 to about 300, percent greater than the melt viscosity of the initial mixture of components (A), (B), (C) and (D).

Other aspects of the present invention pertain to cured products, coatings, laminates, composites, adhesives, castings, encapsulated articles, molded articles and the like prepared from the aforementioned compositions.

DETAILED DESCRIPTION OF THE INVENTION

Suitable compounds which can be employed herein as an extender include any compound having an average of about 2 hydrogen atoms per molecule which are reactive with vicinal epoxy groups.

Suitable dihydric and polyhydric phenolic compounds which can be employed in the present invention as the extender include, for example, phthaleins and sulfonphthaleins having two phenolic hydroxyl groups, xanthenes having two phenolic hydroxyl groups and those represented by the formulas

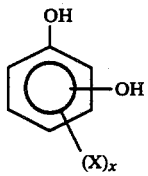
I.

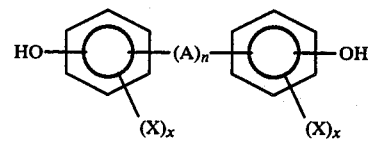
II.

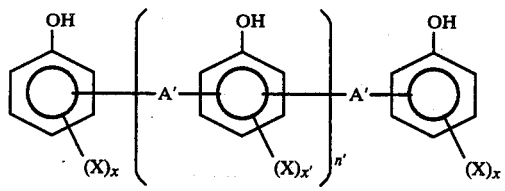
III.

wherein A is a divalent hydrocarbyl group having from 1 to about 10 carbon atoms, —O—, —S—, —S—S—,

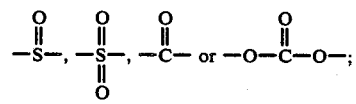

A' is a divalent hydrocarbyl group having from about 1 to about 10 carbon atoms or a divalent polycyclopentadiene group; each X is independently a monovalent hydrocarbyl group having from 1 to about 10 carbon atoms, or a halogen; n has a value of zero or 1; n' has an average value of greater than zero but not greater than about 0.5; x has a value of from zero to 4; and x' has a value from zero to 3.

Suitable such phenolic hydroxyl-containing compounds include, for example, resorcinol, catechol, hydroquinone, bisphenol A, bisphenol K, bisphenol S, tetramethylbisphenol A, tetratertiarybutylbisphenol A, tetrabromobisphenol A, phenolphthalein, phenolsulfonphthalein, fluorescein, 4,4'-dihydroxybiphenyl, 3,5,3',5'-tetramethyl-4,4'-dihydroxybiphenyl, 3,5,3',5'-tetrabromodihydroxybiphenyl, 3,5,3',5'-tetramethyl-2,6,2',6'-tetrabromo-4,4'-dihydroxybiphenyl, reaction products of dicyclopentadiene or oligomers thereof and a phenolic compound, mixtures thereof and the like.

Other suitable compounds which can be employed as an extender include for example, aniline, toluidine, butylamine, ethanolamine, N,N'-dimethyl phenylene diamine, phthalic acid, adipic acid, fumaric acid, 1,2-dimercapto-4-methylbenzene, diphenyloxide dithiol, 1,4-butanedithiol, mixtures thereof and the like.

Suitable epoxy resins which can be employed herein include glycidyl ethers of phthaleins, sulfonphthaleins and xanthenes having two or more phenolic hydroxyl groups before reaction with an epihalohydrin and subsequent dehydrohalogenation to form said glycidyl ether and those represented by the formulas

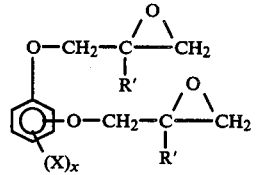
IV.

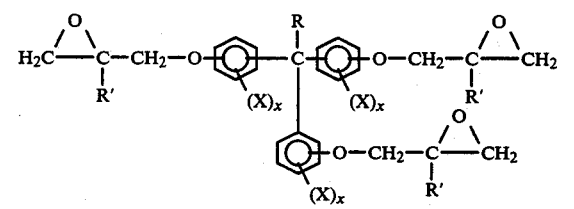
V.

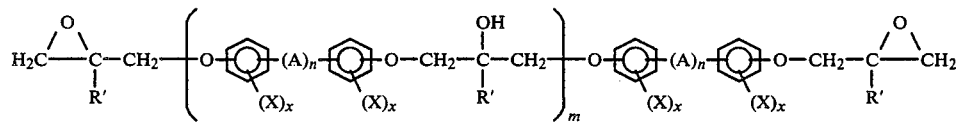

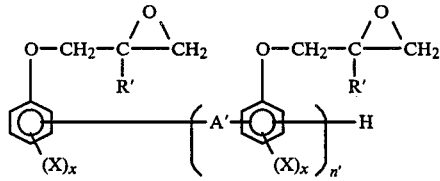

wherein A is a divalent hydrocarbyl group having from 1 to about 10 carbon atoms, —O—, —S—, —S—S—,

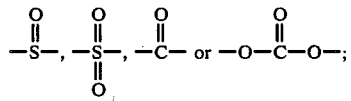

A' is a divalent hydrocarbyl group having from 1 to about 10 carbon atoms or a divalent polycyclopentadiene group; R is hydrogen or a hydrocarbyl group having from 1 to about 10 carbon atoms; R' is hydrogen or a hydrocarbyl group having from 1 to about 4 carbon atoms; each X is independently a monovalent hydrocarbyl group having from 1 to about 10 carbon atoms, or a halogen; m has an average value of from zero to about 10; n has a value of zero or 1; n' has an average value of from about 1.01 to about 7; and x has a value of from zero to about 4.

Other suitable epoxy resins include glycidyl derivatives of amines, thiol, and acid compounds such as, for example, N,N,N',N'-tetrakis-(2,3-epoxypropyl)-p,p'-methylenedianiline, N,N-bis(2,3-epoxypropyl)-4-aminophenylglycidylether, diglycidyl thioether of diphenyloxide dithiol, diglycidylether of thiobisphenol A, N,N,N',N'-tetraglycidyl-4,4'-diamino diphenyl methane, 1,1,2,2-tetrakis(2,3-epoxypropoxyphenyl)ethane, digycidyl adipate, diglycidyl phthalate, mixtures thereof and the like.

Other suitable epoxy resins include the cycloaliphatic epoxides such as, for example, 3,4-epoxycyclohexylmethyl-3,4-epoxycyclohexane carboxylate, vinyl cyclohexene dioxide, mixtures thereof and the like.

Suitable epoxy curing agents include primary and/or secondary amines, polyamides, mercaptans, carboxylic acids, carboxylic acid anhydrides, guanidines biguanides, aromatic sulfonic acid amides, imidazoles mixtures thereof and the like.

Suitable aromatic sulfonic acid amides which can be employed herein include, for example, those represented by the formula

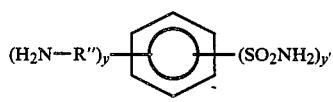

wherein each R'' is independently a single bond or a divalent hydrocarbon group having from 1 to about 4 carbon atoms, each y and y' independently have values from 1 to about 3, preferably each have a value of 1.

Particularly suitable curing agents include, for example, methylenedianiline, diaminodiphenyl sulfone, aminoethylpyrizine, 2-methylimidazole, dicyanidiamide, ethylene diamine, diethylene triamine, triethylenetetramine, diaminocyclohexane, 4,4'-methylenedicyclohexylamine, phenylene diamine, sulfanilamide, aminoethylpiperizine, 3-(4-hydroxyphenyl)-3-(4-aminophenyl)propane, boron trifluoride monoethylamine, mixtures thereof and the like.

Also, polyfunctional phenolic compounds can be employed as curing agents such as, for example, phloroglucinol, pyrogallol, diphenolic acid, tetrabromodiphenolic acid, tetramethyltrihydroxylbiphenyl, polyphenolics resulting from condensing an aldehyde with a phenolic compound or substituted phenolic compound or reaction products of dicyclopentadiene and oligomers thereof and a phenolic compound. Particularly suitable polyfunctional phenolic compounds include the novolac resins represented by formula III where n' has an average value of from about 1.01 to about 4 and condensation products of hydroxy benzaldehyde and a phenolic compound.

Other suitable curing agents include, for example, phthalic anhydride, trimellitic anhydride, nadic methyl anhydride, trimellitic acid, mixtures thereof and the like.

Suitable curing agents which are capable of acting as catalyst between the epoxy resin and the material having active hydrogen atoms reactive with an epoxy group include, for example, amines, amides, guanidines and sulfonamides such as, for example, aminoethylpiperazine, 2-methylimidazole, dicyanidiamide, ethylene diamine, diethylene triamine, triethylene tetramine, diaminocyclohexane, sulfanilamide, mixtures thereof and the like.

Suitable catalysts for effecting the reaction between the epoxy resin and the phenolic hydroxyl-containing compound include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216, 4,302,574, 4,320,222, 4,358,578 4,366,295, and 4,389,520, all of which are incorporated herein by reference.

Particularly suitable catalysts are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.acetic acid complex), ethyltriphenylphosphonium tetrahaloborate, tetrabutylphosphonium chloride, tetrabutylphosphonium bromide, tetrabutylphosphonium iodide, tetrabutylphosphonium acetate, tetrabutylphosphonium diacetate (tetrabutylphosphonium acetate.acetic acid complex), tetrabutylphosphonium tetrahaloborate, butyltriphenylphosphonium tetrabromobisphenate, butyltriphenylphosphonium bisphenate, butyltriphenylphosphonium bicarbonate, benzyltrimethylammonium chloride, benzyltrimethylammonium hydroxide, benzyltrimethylammonium tetrahaloborate, tetramethylammonium hydroxide, tetrabutylammonium hydroxide, tetrabutylammonium tetrahaloborate, and mixtures thereof and the like.

Other suitable catalysts include tertiary amines such as, for example, triethylamine, tripropylamine, tributylamine, 2-methylimidazole, benzyldimethylamine, mixtures thereof and the like.

Other suitable catalysts include ammonium compounds such as, for example, triethylamine.HCl complex, triethylamine.HBr complex, triethylamine.HI complex, triethylamine.tetrahaloboric acid complex, tributylamine.HCl complex, tributylamine.HBr complex, tributylamine.HI complex, tributylamine.tetrahaloboric acid complex, N,N'-dimethyl-1,2-diaminoethane.tetrahaloboric acid complex, and mixtures thereof and the like.

Other suitable catalysts include quaternary and tertiary ammonium, phosphonium, and arsonium adducts or complexes with suitable non-nucleophilic acids such as, for example, fluoboric, fluoarsenic, fluoantimonic, fluophosphoric, perchloric, perbromic, periodic, mixtures thereof and the like.

Suitable stabilizers include organic and inorganic acids, salts and esters of organic and inorganic acids such as, for example, sulfonic acid, perchloric acid, boric acid, chloric acid, bromic acid, iodic acid, nitric acid.

Particularly suitable are p-toluene sulfonic acid, benzene sulfonic acid, methyl p-toluene sulfonate, ammonium perchlorate, fluoboric acid, perchloric acid, nitric acid, mixtures thereof and the like.

The products of the present invention are suitable for such applications as laminates, composites, coatings, adhesives, castings, moldings, electronic encapsulations and in potting compositions.

Suitable solvents which can be employed in the preparation of coatings, laminates and the like include, for example, ketones, alcohols, glycol ethers, aromatic and aliphatic hydrocarbons, cyclic ethers, halogenated hydrocarbons, and amides, such as, for example, acetone, methyl ethyl ketone, methanol, propylene glycol methyl ether and dimethyl formamide.

The products and compositions of the present invention may also contain, if desired, pigments, dyes, mold release agents, flow control agents, reinforcing agents, fillers, fire retardant agents, rubber modifiers, surfactants, accelerators, reactive diluents, mixtures thereof and the like.

The following examples are illustrative of the present invention but are not to be construed as to limiting the scope thereof in any manner.

The following components were employed in the examples and comparative experiments.

EPOXY RESIN A was a diglycidyl ether of bisphenol A having an average epoxide equivalent weight (EEW) of about 184.5.

EPOXY RESIN B was a diglycidyl ether of bisphenol S, bis(4-hydroxyphenyl)sulfone, having an average EEW of about 193.7.

EPOXY RESIN C was a phenol-formaldehyde epoxy novolac resin having an average functionality of about 3.6 and an average EEW of about 179.7.

EPOXY RESIN D was a triglycidyl ether of tris(hydroxyphenyl)methane having an average EEW of about 166.

EPOXY RESIN E was a diglycidyl ether of bisphenol K, bis(4-hydroxyphenyl)carbonyl, having an average EEW of about 178.1.

EPOXY RESIN F was a diglycidyl ether of tetrabromo bisphenol A having an average EEW of about 336.

EPOXY RESIN G was a triglycidyl ether of tris(hydroxyphenyl)methane having an average EEW of about 163.

EPOXY RESIN H was the dehydrohalogenated reaction product of phenolphthalein and epichlorohydrin having an average EEW of about 247.

EPOXY RESIN I was the diglycidyl ether of 3,5,3',5'-tetramethyl-2,6,2'6'-tetrabromo-4,4'-dihydroxybiphenyl having an average EEW of 412.

EPOXY RESIN J was a diglycidyl ether of bisphenol A having an average epoxide equivalent weight of 181.3.

EPOXY RESIN K was a diglycidyl ether of tetrabromo bisphenol A having an average EEW of 328.

EPOXY RESIN L was the diglycidyl ether of tetrachloro bisphenol A having an average EEW of about 246.

EPOXY RESIN M was a diglycidyl ether of bisphenol A having an average epoxide equivalent weight of 180.8. EPOXY RESIN N was a diglycidyl ether of bisphenol A having an average epoxide equivalent weight of 181.5.

EXTENDER COMPOUND A was tetrabromobisphenol A having an average phenolic hydroxyl equivalent weight (PHEW) of about 272.

EXTENDER COMPOUND B was bisphenol K, bis(4-hydroxyphenyl)carbonyl, having an average PHEW of about 107.

EXTENDER COMPOUND C was bisphenol S, bis(4-hydroxyphenyl)sulfone, having an average PHEW of about 125.

EXTENDER COMPOUND D was 3,5,3',5'-tetramethyl-2,6,2',6'-tetrabromo-4,4'-dihydroxy biphenyl having an average PHEW of about 279.

EXTENDER COMPOUND E was tetramethyltribromodihydroxy biphenyl having an average PHEW of about 239.

EXTENDER COMPOUND F was pyrogallol having an average PHEW of about 42.

EXTENDER COMPOUND G was dimethylhydantoin having an average equivalent weight of about 64.

EXTENDER COMPOUND H was tetramethyl bisphenol A having a phenolic equivalent weight of about 142.

EXTENDER COMPOUND I was tetrachloro bisphenol A, with a phenolic equivalent weight of about 183.

EXTENDER COMPOUND J was tetramethyl bisphenol K having a phenolic equivalent weight of about 135.

EXTENDER COMPOUND K was tetrabromobisphenol K having a phenolic equivalent weight of about 265.

EXTENDER COMPOUND L was tetrabromodiphenolic acid having a phenolic equivalent weight of about 301.

CURING AGENT A was sulfanilamide having an active hydrogen equivalent weight of about 43.

CURING AGENT B was methylene dianiline having an amine hydrogen equivalent weight of 51.

CURING AGENT C was triethylene tetramine, having an amine hydrogen equivalent weight of 24.5.

CURING AGENT D was a mixture of diaminocyclohexane isomers available from Pacific Anchor Chemical Corp. as ANCAMINE ® 1770 having an amine hydrogen equivalent weight of 28.5.

CURING AGENT E was 4-aminosalicyclic acid having an equivalent weight of 38.25.

CURING AGENT F was 4,4'-diaminodiphenylsulfone having an amine hydrogen equivalent weight of about 62.

CURING AGENT G was NADIC methyl anhydride.

CATALYST A was a 70% solution of tetrabutylphosphonium acetate.acetic acid complex in methanol.

CATALYST B was a 30% solution of tetrabutylphosphonium acetate.acetic acid complex in methanol containing a stoichiometric amount of ortho phosphoric acid.

CATALYST C was a 35% of tetrabutylphosphonium acetate.acetic acid complex in methanol containing a stoichiometric amount of fluoroboric acid.

CATALYST D was a 33.5% solution of tributylamine in methanol containing a stoichiometric amount of fluoroboric acid.

CATALYST E was a 35% solution of N,N'-dimethyl-1,2-diaminoethane.tetrafluoroboric acid complex in methanol.

STABILIZER A was methyl-p-toluene sulfonate.

STABILIZER B was p-toluene sulfonic acid.-monohydrate.

The Tg was determined by Differential Scanning Calorimetry using a calibrated DuPont Instrument (Model No. 912 with a 1090 controller). Samples were run under a nitrogen atmosphere with a heat-up rate of 10° C. per min. (0.1667° C./sec.).

The Izod impact was determined by ASTM D-256.

The viscosities were determined using a cone and plate viscometer available from ICI Research Equipment (London).

FRACTURE TOUGHNESS MEASUREMENT
($G_{IC}$)

The method for measuring $G_{IC}$ (fracture toughness or "critical strain energy release rate") is an adaptation of ASTM E-399 for plastics materials from the original usage with metals. The compact tension test is now widespread in usage and is described in the *J. Mater. Sci.*, Vol. 16, 2657, 1981. An individual test piece is cut as an approximate 1" (25.4 mm) square from a flat casting usually of ⅛" (3.175 mm) thickness. A dovetail notch is cut into one edge, centered, about ¼" (6.25 mm) in depth. Next, a razor blade is inserted into this notch and tapped to produce a precrack. Two holes are then drilled adjacent to the dovetail as indicated in ASTM E-399, allowing the test piece to be pinned into position in the Instron test machine. Extension of the sample now allows the force required to propagate opening of the precrack to be measured, using a test speed of 0.02 inches/minute (0.0085 mm/sec.). This force is used in the equation given in ASTM E-399, along with the required sample dimensions and actual precrack length, to calculate a "stress intensification factor" $K_Q$. This is then combined with the tensile modulus (in those instances where the tensile modulus was not measured, a value of 300,000 psi was used) and Poisson's ratio for the material to give the value for $G_{IC}$, usually reported in $ergs/cm^2 \times 10^6$. A scale comparing typical values for $G_{IC}$ for various plastics and metals is given in reference Lee, L. H., "Physicochemical Aspects of Polymer Surfaces", K. L. Mittal, ed. Plenum Press, New York, N.Y., 1983.

GENERAL PROCEDURE

A mixture of epoxy resin, phenolic hydroxylcontaining compound, suitable epoxy curing agent and catalyst was mixed at the indicated temperature. After thorough mixing, the mixture was degassed by evacuating the mixture to a pressure of 1 mm Hg. At this stage, the viscosity of the partially advanced epoxy resin was at least 20% greater than the viscosity of the initial mixture. The resultant degassed mixture was then poured into a mold consisting of two (8 in. × 8 in. (203 mm × 203 mm) polished aluminum plates separated by a ⅛ inch (3.175 mm) silicone rubber gasket. The cast mixture was allowed to cure at elevated temperature after which the resultant cured, cast sheet was demolded and cut into various test samples for testing. The components, mixing temperature, curing temperature and test results are given in the following Table I.

TABLE I

| COMPONENTS CONDITIONS AND PROPERTIES | EXAMPLE NUMBER | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| EPOXY RESIN, TYPE/pbw[1] | A/35 | A/35 | A/35 | A/35 | B/35 | B/35 | B/35 | C/35 | C/35 | C/35 | D/35 | D/35 |
| EPOXY RESIN, equiv. | 0.19 | 0.19 | 0.19 | 0.19 | 0.181 | 0.181 | 0.181 | 0.195 | 0.195 | 0.195 | 0.211 | 0.211 |
| EXTENDER COMPOUND, TYPE/pbw[1] | A/38.7 | A/25.8 | A/12.9 | A/7.74 | C/16.94 | C/11.29 | C/5.65 | A/39.73 | A/26.49 | A/13.24 | A/43.01 | A/28.67 |
| EXTENDER COMPOUND, equiv. | 0.142 | 0.095 | 0.047 | 0.029 | 0.136 | 0.09 | 0.045 | 0.146 | 0.097 | 0.049 | 0.158 | 0.105 |
| CATALYST, TYPE/ml | A/0.1 | A/0.1 | A/0.1 | A/0.1 | A/0.1 | A/0.1 | A/0.1 | A/0.1 | A/0.1 | A/0.1 | A/0.1 | A/0.1 |
| CURING AGENT, TYPE/pbw[1] | A/1.73 | A/3.47 | A/5.2 | A/5.89 | A/1.65 | A/3.3 | A/4.95 | A/1.78 | A/3.56 | A/5.34 | A/1.93 | A/3.85 |
| CURING AGENT, equiv. | 0.04 | 0.081 | 0.121 | 0.137 | 0.038 | 0.077 | 0.115 | 0.041 | 0.083 | 0.124 | 0.045 | 0.09 |
| RATIO[2] | 0.75/0.21 | 0.5/0.425 | 0.25/0.637 | 0.15/0.721 | 0.75/0.21 | 0.5/0.425 | 0.25/0.636 | 0.75/0.21 | 0.50/0.425 | 0.25/0.636 | 0.749/0.213 | 0.498/0.426 |
| MIXING AND DEGASSING TEMPERATURE, °C. | 130–140 | 130–140 | 130–140 | 130–140 | 130–140 | 130–140 | 130–140 | 140–150 | 140–150 | 140–150 | 150 | 150 |
| CURING CONDITIONS °C./sec | 140/57600 200/7200 225/7200 | 140/57600 200/7200 225/7200 | 140/57600 200/7200 225/7200 | 140/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 |
| Tg, °C. | 133 | 138 | 154 | 165 | 171 | 186 | 214 | 151 | 162 | 189 | 194 | 214 |
| G$_{IC}$ | 2.0 | 1.09 | 0.62 | 0.35 | 0.57 | 0.58 | 0.29 | 0.51 | 0.29 | 0.2 | 0.33 | 0.26 |
| IZOD IMPACT | | | | | | | | | | | | |
| ft. lbs/in. of notch | 1.41 | 1.39 | N.D.[3] | N.D.[3] | N.D.[3] | 1.37 | N.D.[3] | 0.79 | N.D.[3] | N.D.[3] | N.D.[3] | N.D.[3] |
| J/cm of notch | 0.75 | 0.74 | | | | 0.73 | | 0.42 | | | | |

| | 13 | 14 | 15 | 16 | 17 | 18 | 19 | 20 | 21 | 22 | 23 | 24 |
|---|---|---|---|---|---|---|---|---|---|---|---|---|
| EPOXY RESIN, TYPE/pbw[1] | D/35 | E/25 | E/25 | E/25 | D/30 | D/35 | D/30 | G/34.4 | G/34.4 | F/30 | F/30 | F/35 |
| EPOXY RESIN, equiv. | 0.0211 | 0.14 | 0.14 | 0.14 | 0.181 | 0.211 | 0.181 | 0.211 | 0.211 | 0.089 | 0.089 | 0.104 |
| EXTENDER COMPOUND, TYPE/pbw[1] | A/14.34 | B/11.62 | B/7.75 | B/3.75 | B/14.77 | B/9.85 | B/4.92 | D/29.43 | E/25.21 | A/18.2 | A/12.1 | A/7.08 |
| EXTENDER COMPOUND, equiv. | 0.053 | 0.109 | 0.072 | 0.035 | 0.138 | 0.092 | 0.046 | 0.106 | 0.106 | 0.067 | 0.045 | 0.026 |
| CATALYST, TYPE/ml | A/0.1 | A/0.1 | A/0.1 | A/0.1 | A/0.1 | A/0.1 | A/0.1 | A/0.1 | A/0.1 | A/0.1 | A/0.1 | A/0.1 |
| CURING AGENT, TYPE/pbw[1] | A/5.78 | A/1.32 | A/2.64 | A/3.85 | A/1.68 | A/3.36 | A/5.04 | A/3.86 | A/3.86 | A/0.82 | A/1.63 | A/2.86 |
| CURING AGENT, equiv. | 0.134 | 0.031 | 0.061 | 0.09 | 0.0391 | 0.078 | 0.117 | 0.898 | 0.0898 | 0.019 | 0.038 | 0.066 |
| RATIO[2] | 0.25/0.635 | 0.779/0.221 | 0.51/0.436 | 0.25/0.643 | 0.75/0.212 | 0.5/0.424 | 0.254/0.646 | 0.502/0.426 | 0.502/0.426 | 0.753/0.214 | 0.5/0.427 | 0.25/0.635 |
| MIXING AND DEGASSING TEMPERATURE, °C. | 140–150 | 130–140 | 130–140 | 130–140 | 150 | 150 | 150 | 150 | 150 | 150 | 150 | 150 |
| CURING CONDITIONS °C./sec | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 | 150/57600 200/7200 225/7200 |
| Tg, °C. | >250 | 143.9 | 160 | 169.5 | 206 | >254 | >260 | >240 | >245 | 156 | 159 | 170 |
| G$_{IC}$ | 0.15 | 7.15 | 1.5 | 1.16 | 0.34 | 0.28 | 0.2 | 0.22 | 0.13 | 2.33 | 1.15 | 0.56 |
| IZOD IMPACT | | | | | | | | | | | | |
| ft. lbs/in. of notch | N.D.[3] | N.D.[3] | N.D.[3] | 0.76 | N.D.[3] | 0.2 | N.D.[3] | N.D.[3] | N.D.[3] | 0.61 | 0.72 | 0.76 |
| J/cm of notch | | | | 0.41 | | 0.1 | | | | 0.33 | 0.38 | 0.41 |

| | 25 | 26 | 27 | 28 | 29 | 30 | 31 | 32 | 33 | 34 | 35 | 36 |
|---|---|---|---|---|---|---|---|---|---|---|---|---|
| EPOXY RESIN, TYPE/pbw[1] | F/30 | F/30 | F/30 | F/35 | H/49.34 | I/30 | L/25 | J/181.3 | J/45.3 | A/25 | K/25 | F/25 |
| EPOXY RESIN, equiv. | 0.089 | 0.089 | 0.089 | 0.104 | 0.20 | 0.073 | 0.102 | 1.0 | 0.25 | 0.136 | 0.076 | 0.074 |
| EXTENDER COMPOUND, TYPE/pbw[1] | D/12.4 | F/1.87 | B/4.78 | G/3.33 | A/27.20 | D/10.15 | I/9.3 | H/71.0 | J/16.9 | K/17.95 | K/10.1 | L/7.47 |
| EXTENDER COMPOUND, equiv. | 0.044 | 0.044 | 0.0447 | 0.052 | 0.10 | 0.036 | 0.051 | 0.50 | 0.125 | 0.068 | 0.038 | 0.037 |
| CATALYST, TYPE/ml | A/0.1 | A/0.1 | A/0.1 | A/0.1 | A/0.11 | A/0.10 | A/0.11 | A/1.08 | C/0.24 | A/0.12 | A/0.10 | A/0.1 |
| CURING AGENT, TYPE/pbw[1] | A/1.63 | A/1.63 | A/1.63 | A/3.33 | A/4.3 | A/1.33 | A/1.86 | A/21.5 | A/5.37 | A/2.48 | A/1.36 | A/1.35 |
| CURING AGENT, equiv. | 0.038 | 0.038 | 0.038 | 0.044 | 0.10 | 0.031 | 0.044 | 0.5 | 0.125 | 0.058 | 0.032 | 0.031 |
| RATIO[2] | 0.5/0.426 | 0.5/0.426 | 0.5/0.426 | 0.5/0.425 | 0.50/0.50 | 0.50/0.425 | 0.5/0.425 | 0.5/0.5 | 0.50/0.50 | 0.05/0.425 | 0.50/0.425 | 0.50/0.425 |
| MIXING AND DEGASSING | 150 | 150 | 150 | 140–150 | 140–150 | 140–150 | 140–150 | 140–150 | 140–150 | 140–150 | 140–150 | 140–150 |

TABLE I-continued

| COMPONENTS CONDITIONS AND PROPERTIES | EXAMPLE NUMBER | | | | | | | | | | | |
|---|---|---|---|---|---|---|---|---|---|---|---|---|
| | 37 | 38 | 39 | 40 | 41 | 42 | 43 | 44 | 45 | 46 | 47 | 48 |
| EPOXY RESIN, TYPE/pbw[1] | A/184.5 | A/184.5 | A/67.95 | F/30 | F/30 | J/67.95 | J/45.3 | J/67.95 | A/25 | M/53.44 | M/45.71 | M/52.95 |
| EPOXY RESIN, equiv. | 1.0 | 1.0 | 0.368 | 0.089 | 0.089 | 0.375 | 0.25 | 0.375 | 0.136 | 0.296 | 0.253 | 0.293 |
| EXTENDER COMPOUND, TYPE/pbw[1] | A/204 | A/204 | A/51.0 | A/12.1 | D/12.4 | A/51.0 | A/51.0 | A/51.0 | A/18.42 | A/40.20 | A/51.57 | A/39.82 |
| EXTENDER COMPOUND, equiv. | 0.75 | 0.75 | 0.187 | 0.044 | 0.045 | 0.187 | 0.187 | 0.187 | 0.068 | 0.148 | 0.190 | 0.146 |
| CATALYST, TYPE/ml | A/0.55 | None | None | A/0.1 | A/0.1 | A/0.21 | B/0.63 | D/0.21 | A/0.1 | A/0.12 | A/0.12 | E/0.18 |
| CURING AGENT, TYPE/pbw[1] | B/12.37 | C/6.1 | A/2.0 + D/4.0 | E/1.45 | A/1.63 | F/9.9 | A/2.29 | A/8.05 | G/9.04 | A/6.35 | A/2.72 | A/6.30 |
| Curing AGENT, equiv. | 0.25 | 0.25 | 0.046 0.14 | 0.0378 | 0.0378 | 0.16 | 0.053 | 0.187 | 0.058 | 0.148 | 0.063 | 0.147 |
| RATIO[2] | 0.75/0.25 | 0.75/0.25 | 0.50/0.125/ 0.375 | 0.05/0.425 | 0.5/0.425 | 0.5/0.425 | 0.75/0.25 | 0.50/0.425 | 0.5/0.425 | 0.50/0.50 | 0.75/0.25 | 0.50/0.50 |
| MIXING AND DEGASSING TEMPERATURE, °C. | 120-130 | 130-140 | 120-130 | 140-150 | 140-150 | 120-130 | 140-150 | 140-150 | 130 | 150 | 150 | 150 |
| CURING CONDITIONS °C./sec | 150/57600 200/7200 | 150/36000 — | 150/14400 200/10800 | 150/57600 200/7200 | 150/57600 200/7200 | 150/14400 200/10800 | 150/57600 200/7200 | 150/14400 200/10800 | 150/57600 200/7200 | 150/57600 200/7200 | 150/57600 200/7200 | 150/57600 200/7200 |
| Tg, °C. | 137 | 131.8 | 138.5 | 147 | 171.6 | 144.2 | 129.9 | 131.3 | 130.4 | 141.4 | 126.7 | N.D.[3] |
| G/c | 0.62 | 1.01 | N.D.[3] | 0.56 | 1.15 | 0.57 | 1.0 | 1.0 | 0.22 | 1.51 | 1.62 | 0.64 |
| IZOD IMPACT ft. lbs/in. of notch J/cm of notch | N.D.[3] | N.D.[3] | N.D.[3] | N.D.[3] | N.D.[3] | N.D.[3] | N.D.[3] | N.D.[3] | N.D.[3] | N.D.[3] | N.D.[3] | N.D.[3] |

[1]Parts by weight
[2]Equivalent ratios of extender/curing agent per equivalent of epoxy
[3]Not determined (Example columns 15/16 header section:)

| COMPONENTS CONDITIONS AND PROPERTIES | EXAMPLE NUMBER | | | | | | | | | | | |
|---|---|---|---|---|---|---|---|---|---|---|---|---|
| TEMPERATURE, °C. CURING CONDITIONS °C./sec | 150/57600 200/7200 | 150/57600 200/7200 | 150/57600 200/7200 | 150/57600 200/7200 | 150/57600 200/7200 | 150/57600 200/7200 225/7200 | 150/57600 200/7200 | 150/57600 200/7200 | 150/57600 200/7200 | 150/57600 200/7200 | 150/57600 200/7200 | 150/57600 200/7200 |
| Tg, °C. | 171.6 | 164 | 162.1 | 160.8 | 174.9 | 189.5 | 141.4 | 114.3 | 139.1 | 121.2 | 121 | — |
| G/c | 1.15 | 0.65 | 1.47 | 0.93 | N.D.[3] | N.D.[3] | 0.32 | N.D.[3] | 0.62 | 1.26 | 1.26 | 0.67 |
| IZOD IMPACT ft. lbs/in. of notch J/cm of notch | N.D.[3] | N.D.[3] | N.D.[3] | N.D.[3] | N.D.[3] | N.D.[3] | N.D.[3] | N.D.[3] | N.D.[3] | N.D.[3] | N.D.[3] | N.D.[3] |

EXAMPLE 49

Epoxy Resin J, 2719.5 grams (15.0 equivalents), and Extender Compound A, 3060.0 grams (11.25 equivalents) were heated with stirring under a nitrogen atmosphere to 150° C. until homogeneous, then 137.1 grams of Curing Agent A was added. After stirring until homogeneous, the mixture was cooled to 78° C. and 16.2 ml of Catalyst C was added and the resin was stored at about 10° C. The resin melt viscosity measured at 100° C. had increased from about 80 cps to 220 cps, an increase in melt viscosity of 175 percent.

EXAMPLE 50

The resin from Example 49, 120.0 grams was cured for 4 hours (14400 s) at 150° C., followed by 3 hours (10800 s) at 200° C. The cured casting had a glass transition temperature (Tg) of 125.6° C. with a $G_{IC}$ value of 1.22 $KJ/m^2$.

EXAMPLE 51

Epoxy Resin J, 181.3 grams (1.00 equivalent) and tetrabromobisphenol A, 136.0 grams (0.50 equivalent) were heated with stirring under a nitrogen atmosphere to 150° C. until homogeneous, then cooled to 100° C. and 0.073 ml of Catalyst A added. This mixture was digested at 100° C. for 52 minutes (3120 s) at which time the melt viscosity measured at 100° C. had increased from about 85 cps to 175-180 cps, an increase in melt viscosity of 105.9-111.8 percent. At this time, 0.047 ml of Stabilizer A was added, the reaction mixture then cooled to 81° C., and 1.21 ml of Catalyst C added. After degassing at about 0.1 mm of Hg for approximately 10 minutes (600 s), 26.35 grams (0.425 equivalent) of Curing Agent F was dispersed in the resin via a high shear mixer. This mixture was then stored at about 10° C.

EXAMPLE 52

The same ratio of reactants as described in Example 51 were poured into an aluminum mold heated to 130° C., then placed in an oven and the temperature increased to 200° C. at the rate of 2° C. per minute. After 4 hours (14400 s) at 200° C. the castings had a glass transition temperature (Tg) of 137.2° C. and a $G_{IC}$ of 0.59.

EXAMPLE 53

Epoxy Resin M, 180.8 grams (1.0 equivalent), Extender Compound A, 136.0 grams (0.50 equivalent) and 4.3 grams (0.10 equivalent) of Curing Agent A were heated with stirring under a nitrogen atmosphere at 120° C. until the melt viscosity measured at 100° C. had increased from about 80 cps to 200 cps, an increase in melt viscosity of 150 percent. Then 0.19 ml of Stabilizer A was added. After 5 minutes (300 s) stirring, the homogeneous mixture was cooled to 70° C., 2.16 ml of Catalyst C added, and the resin cooled to ambient temperature.

EXAMPLE 54

A portion of the resin from Example 53, 714.8 grams was mixed at 130° C. with 47.0 grams, 0.76 equivalents of Curing Agent F until homogeneous, then cured for 4 hours (14400 s) at 150° C. followed by 3 hours (10800 s) at 200° C. The cured casting had a glass transition temperature of 134.9° C. and a $G_{IC}$ value of 0.61 $KJ/m^2$.

EXAMPLE 55

Epoxy Resin M, 1012.5 grams (5.6 equivalents), 761.6 grams (2.8 equivalents) of Extender A, and 24.08 g (0.56 equivalent) of Curing Agent A were heated with stirring under a nitrogen atmosphere at 120° C. until the melt viscosity measured at 100° C. had increased from about 80 cps to 200 cps, an increase in melt viscosity of 150 percent. Then 1.06 grams (5.6 meqs.) of Stabilizer B was added. After 5 minutes (300 s) at 120° C., the homogeneous mixture was cooled to 70° C., 12.1 ml (11.2 meqs.) of Catalyst C added, and the resin cooled to ambient.

EXAMPLE 56

A portion of the resin from Example 55, 731.9 grams was mixed at 130° C. with 48.06 grams, 0.78 equivalent, of Curing Agent F until homogeneous, then cured for 4 hours (14400 s) at 150° C. followed by 3 hours (10800 s) at 200° C. The cured casting had a glass transition temperature of 137.3 and a $G_{IC}$ value of 0.72.

EXAMPLE 57

Resin J, 9.06 grams, 6.80 grams of Extender A, and 0.27 gram of Curing Agent A were heated with stirring to 150° C. until homogeneous. Multiple batches of this formulation were stored at the temperatures indicated in Table II and the change in melt viscosity with time measured in cps at 125° C.

EXAMPLE 58

Resin J, 9.06 grams, 6.80 grams of Extender A, and 0.27 gram of Curing Agent A were heated with stirring to 150° C. until homogeneous. Then 0.009 ml of Stabilizer A was added. Multiple batches of this formulation were stored at the temperature indicated in Table II and the change in melt viscosity with time measured in cps at 125° C.

EXAMPLE 59

Example 53 was repeated, except that Catalyst C was not added. The change in melt viscosity with time measured in cps at 125° C. is shown in Table II compared to Example 53.

TABLE II

|  | Example 57 | Example 58 | Example 59 | Example 53 |
|---|---|---|---|---|
| Ambient Temp. (~23° C.) |  |  |  |  |
| Initial | 40 | 40 | 200 | 200 |
| 5 weeks | N.D.* | N.D. | 245 | 200 |
| 9 weeks | 80 | 65 | N.D. | N.D. |
| 13 weeks | N.D. | N.D. | N.D. | 235 |
| 52° C. Storage |  |  |  |  |
| Initial | 40 | 40 | 200 | 200 |
| 10 days | N.D. | N.D. | 400 | 260 |
| 11 days | 110 | 65 | N.D. | N.D. |
| 23 days | 210 | 95 | 590 | 355 |
| 5 weeks | 500 | 165 | >1,000 | 710 |
| 70° C. Storage |  |  |  |  |
| Initial | 40 | 40 | N.D. | N.D. |
| 3 hours | 40 | 40 | N.D. | N.D. |
| 4½ hours | 50 | 50 | N.D. | N.D. |
| 24 hours | 60 | 55 | N.D. | N.D. |
| 96 hours | 145 | 80 | N.D. | N.D. |

*N.D. = not determined

COMPARATIVE EXPERIMENT A

The exact amounts as described in Example 46 were reacted as follows: the epoxy resin, tetrabromobisphenol A, and 0.1 ml of the catalyst were mixed and allowed to react together at 150° C. for one hour (3600 s) then the curing agent and remainder of the catalyst were added, and a casting poured and cured as described in Example 46. The properties of the cured casting compared to Example 46 are shown in Table III.

COMPARATIVE EXPERIMENT B

The exact amounts as described in Example 47 were reacted as follows: the epoxy resin, tetrabromobisphenol A and 0.1 ml of catalyst were mixed and allowed to react together at 150° C. for one hour (3600 s). Then the curing agent and the remainder of the catalyst were added, and a casting poured and cured as described in Example 47. The properties of the cured casting compared to Example 47 are shown in Table III.

TABLE III

| Cured Properties | Example 46 | Comp. Expt. A | Example 47 | Comp. Expt. B |
| --- | --- | --- | --- | --- |
| Tg (°C.) | 141.4 | 136.8 | 126.7 | 127.2 |
| $G_{IC}$ (kJ/m$^2$) | 1.51 | 1.10 | 1.62 | 1.06 |
| Izod impact ft. #'s/in. | | | | |
| unnotched | 14.3 | 9.7 | 34.8 | 20.5 |
| J/cm | 7.6 | 5.2 | 18.6 | 10.9 |
| Elongation (%) | (9.5) | 5.3 | 19.5 | 10.8 |
| Viscosity (cps @ 100° C.) | 80 | >4000 | 80 | >4000 |
| Pa · s | 0.08 | >4 | 0.08 | >4 |

EXAMPLE 60

A high solids laminating varnish was prepared by reacting 181.5 grams (1.0 equivalent) of Epoxy Resin N, 95.2 grams (0.35 equivalent) of Extender Compound A, and 27.95 grams (0.65 equivalent) of Curing Agent A at 130° C. for 25 minutes (1500 s). During this time, the viscosity measured at 100° C. increased from 190 cps (0.19 pa.s) to 750 cps (0.75 pa.s), a 395 percent increase. The reaction mixture was then cooled, and 76.1 grams of methyl ethyl ketone slowly added. The final product was a homogenous, clear liquid with a viscosity at 25° C. of 1,011 cps (1.001 pa.s).

COMPARATIVE EXPERIMENT C

Example 60 was repeated, except the resin was not partially reacted before the solvent was added. After stirring for 16 hours (57,600 s) at 25° C., the mixture had not become homogenous. Even after 1½ hours (5400 s) stirring at 60° C., followed by ½ hour (1800 s) stirring at 80° C. (boiling point of the methyl ethyl ketone), the mixture contained large amounts of undissolved solid particles, making this formulation unsuitable as a laminating varnish.

We claim:

1. A partially advanced epoxy resin composition comprising a product resulting from reacting a composition comprising
   (A) at least one relatively low equivalent weight epoxy resin having an average of more than one vicinal epoxy group per molecule;
   (B) at least one extender material having an average of about two active hydrogen atoms per molecule which are reactive with vicinal epoxy groups;
   (C)
   (1) optionally, one or more catalysts for promoting the reaction between components (A) and (B);
   (2) one or more epoxy resin curing agents selected from the group consisting of amines, mercaptans, carboxylic acids, carboxylic acid anhydrides, aromatic sulfonic acid amides and imidazoles; or
   (3) a combination of (1) and (2); and
   (D) one or more stabilizer materials; wherein
   (i) components (A), (B), (C) and (D) are present in quantities which provide from about 0.1 to about 0.9 active hydrogen equivalent in component (B) per epoxide equivalent in component (A); from about 0.05 to about 0.9 equivalent of component (C2) per epoxide equivalent in component (A); from about zero to about 0.1 mole of component (C1) per epoxide equivalent in component (A); the combined equivalents of components (B) and (C2) per epoxide equivalent in component (A) is from about 0.15:1 to about 1.1:1 and component (D) is present in a quantity which is sufficient to reduce the viscosity increase of the resultant partially advanced epoxy resin composition during storage; and
   (ii) the composition is partially advanced to the extent that the melt viscosity has increased to a value which is greater than about 20 percent greater than the melt viscosity of the initial mixture of components (A), (B), (C) and (D) with the proviso that said partially advanced composition is melt flowable at or below about 250° C. and if said increase in melt viscosity is greater than about 1250 percent, a solvent is required.

2. A partially advanced epoxy resin of claim 1 wherein
   (i) component (A) is a polyglycidyl ether of a polyhydric aromatic compound;
   (ii) component (B) is selected from phthaleins, sulfonphthaleins, or xanthenes having at least two hydroxyl groups per molecule; those materials represented by formulas (I), (II) or (III) in the specification or a combination thereof;
   (iii) components (A), (B), (C) and (D) are present in quantities which provide from about 0.15 to about 0.85 active hydrogen equivalent in component (B) per epoxide equivalent in component (A); from about 0.00005 to about 0.05 mole of component (C1) per epoxide equivalent in component (A); from about 0.05 to about 0.75 equivalent of component (C2) per epoxide equivalent in component (A); the combined equivalents of components (B) and (C2) per epoxide equivalent in component (A) is from about 0.2:1 to about 1.05:1; and from about 0.0001 to about 0.01 mole of component (D) per epoxide equivalent in component (A); and
   (iv) the composition is partially advanced to the extent that the melt viscosity has increased to a value of from about 25 to about 625 percent greater than the melt viscosity of the initial mixture of components (A), (B), (C) and (D).

3. A partially advanced epoxy resin composition of claim 2 wherein
   (i) component (A) is selected from those compounds represented by formulas (IV), (V), (VI) or (VII) in the specification, diglycidyl ethers of phthaleins, sulfonphthaleins or xanthanes or a combination thereof;
   (ii) components (A) and (B) are employed in quantities which provide from about 0.25 to about 0.75 active hydrogen equivalent per epoxide equivalent;

(iii) component (C1) is a quaternary phosphonium or ammonium compound, an imidazole or a combination thereof and is employed in an amount of from about 0.0001 to about 0.03 mole per epoxide equivalent in component (A);

(iv) component (C2) is selected from amines, aromatic sulfonic acid amides, imidazoles or a combination thereof and is present in a quantity of from about 0.075 to about 0.75 equivalents per epoxide equivalent in component (A);

(v) the combined equivalents of components (B) and (C2) per epoxide equivalent in component (A) is from about 0.325:1 to about 1:1;

(vi) component (D) is selected from organic or inorganic acids, salts or esters of organic and inorganic acids or a combination thereof and is present in a quantity which provides from about 0.0005 to about 0.005 mole per epoxide equivalent in component (A); and (vii) the composition is partially advanced to the extend that the melt viscosity has advanced to a value of from about 50 percent to about 300 percent greater than the melt viscosity of the initial mixture of components (A), (B), (C) and (D).

4. A partially advanced epoxy resin composition of claim 3 wherein (i) component (A) is a diglycidyl ether of bisphenol A, bisphenol S, bisphenol K, tetrabromobisphenol A, phenolphthalein, 3,5,3',5'-tetramethyl-2,6,2',6'-tetrabromo-4,4'-dihydroxybiphenyl, tetramethyltribromodihydroxybiphenyl, the triglycidyl ether of tris(hydroxyphenyl)methane or a combination thereof;

(ii) component (B) is tetrabromobisphenol A, bisphenol A, bisphenol K, bisphenol S, 3,5,3',5'-tetramethyl-2,6,2',6'-tetrabromo-4,4'-dihydroxybiphenyl, dimethylhydantoin, tetramethyltribromodihydroxy-biphenyl, tetramethylbisphenol K, tetrabromobisphenol K or a combination thereof;

(iii) components (C2) is sulfanilamide, methylene dianiline, triethylenetetramine, diaminocyclohexane, 4-aminosalicyclic acid, 2-methylimidazole, 4,4'-diaminodiphenylsulfone or a combination thereof; and (iv) component (D) is p-toluene sulfonic acid, benzene sulfonic acid, methyl p-toluene sulfonate, ammonium perchlorate, fluoboric acid, perchloric acid, nitric acid or a combination thereof.

5. A partially advanced epoxy resin of claim 4 wherein (i) component (A) is a diglycidyl ether of bisphenol A having an average epoxide equivalent weight of from about 170 to about 300;

(ii) component (B) is bisphenol A, tetramethyltribromodihydroxybiphenyl or tetrabromobisphenol A;

(iii) component (C) is a mixture of components (C1) and (C2);

(iv) component (C1) is the product resulting from a mixture of a quaternary phosphonium acetate.acetic acid complex and fluoboric acid in a respective molar ratio of from about 1:0.9 to about 1:1.25, 2-methylimidazole or a combination thereof;

(v) component (C2) is sulfanilamide, 4,4'-diaminodiphenylsulfone, or a combination thereof; and (vi) component (D) is methyl p-toluenesulfonate, fluoboric acid or a combination thereof.

6. A product resulting from reacting and curing a composition comprising a mixture of (I) a partially advanced epoxy resin of claims 1, 2, 3, 4 or 5;

(II) at least one curing agent therefor; and (III) optionally, a catalytic quantity of one or more catalysts for effecting the reaction between components (IA) and (IB); and wherein the components are employed in an equivalent ratio of (IA):(IB):(IC2+II) of from about 1:0.1:0.5 to about 1:0.9:0.2; the combined equivalents of components (IB), (IC2) and (II) per epoxide equivalent in component (IA) is from about 0.6:1 to about 1.1:1 and the combined quantity of components (IC1) and (III) is that which provides from about zero to about 0.2 mole of catalyst per epoxide equivalent in component (IA).

7. A product of claim 6 wherein (i) the equivalent ratio of components (IA):(IB):(IC2+II) is from about 1:0.15:0.7 to about 1:0.85:0.2;

(ii) the combined equivalents of components (IB), (IC2) and (II) per epoxide equivalent in component (IA) is from about 0.85:1 to about 1.05:1; and (iii) components (IC1) and (III) are present in a combined quantity which provides from about 0.0001 to about 0.1 mole of catalyst per epoxide equivalent in component (IA).

8. A product of claim 7 wherein (i) the equivalent ratio of components (IA):(IB):(IC2+II) is from about 1:0.25:0.65 to about 1:0.75:0.3;

(ii) the combined equivalents of components (IB), (IC2) and (II) per epoxide equivalent in component (IA) is from about 0.9:1 to about 1.05:1; and (iii) components (IC1) and (III) are present in a combined quantity which provides from about 0.0005 to about 0.05 mole of catalyst per epoxide equivalent in component (IA).

9. A product of claim 8 wherein (i) component (C1) is a quaternary phosphonium or ammonium compound, an imidazole or a combination thereof; and (ii) component (II) is selected from amines, mercaptans, carboxylic acids, carboxylic acid anhydrides, guanidines, aromatic sulfonic acid amides, imidazoles or a combination thereof.

10. A product of claim 9 wherein (i) component (C1) is the product resulting from a mixture of a quaternary phosphonium acetate.acetic acid complex and fluoboric acid in a respective molar ratio of from about 1:0.9 to about 1:1.25, 2-methylimidazole or a combination thereof; and (ii) component (II) is sulfanilamide, methylene dianiline, triethylenetetramine, diaminocyclohexane, 4-aminosalicylic acid, 2-methylimidazole, dicyandiamide, 4,4'-diaminodiphenylsulfone or a combination thereof.

11. A product of claim 6 which is a structural or an electrical laminate or composite.

12. A product of claim 7 which is a structural or an electrical laminate or composite.

13. A product of claim 8 which is a structural or an electrical laminate or composite.

14. A product of claim 9 which is a structural or an electrical laminate or composite.

15. A product of claim 10 which is a structural or an electrical laminate or composite.

16. A product of claim 6 which is a coating, casting, adhesive, encapsulated article or molded article.

17. A product of claim 7 which is a coating, casting, adhesive, encapsulated article or molded article.

18. A product of claim 8 which is a coating, casting, adhesive, encapsulated article or molded article.

19. A product of claim 9 which is a coating, casting, adhesive, encapsulated article or molded article.

20. A product of claim 10 which is a coating, casting, adhesive, encapsulated article or molded article.

21. A laminating varnish comprising a mixture of
(I) a partially advanced epoxy resin of claims 1, 2, 3, 4 or 5;
(II) at least one curing agent therefor; and
(III) optionally, a catalytic quantity of one or more catalysts for effecting the reaction between components (IA) and (IB); and
(IV) optionally, one or more solvents in a quantity sufficient to provide a suitable application viscosity; and
wherein the components are employed in an equivalent ratio of (IA):(IB):(IC2+II) of from about 1:0.1:0.5 to about 1:0.9:0.2; the combined equivalents of components (IB), (IC2) and (II) per epoxide equivalent in component (IA) is from about 0.6:1 to about 1.1:1 and the combined quantity of components (IC1) and (III) is that which provides from about zero to about 0.2 mole of catalyst per epoxide equivalent in component (IA).

22. A laminating varnish of claim 21 wherein
(i) the equivalent ratio of components (IA):(IB):(IC2+II) is from about 1:0.15:0.7 to about 1:0.85:0.2;
(ii) the combined equivalents of components (IB), (IC2) and (II) per epoxide equivalent in component (IA) is from about 0.85:1 to about 1.05:1; and
(iii) components (IC1) and (III) are present in a combined quantity which provides from about 0.0001 to about 0.1 mole of catalyst per epoxide equivalent in component (IA).

23. A laminating varnish of claim 22 wherein
(i) the equivalent ratio of components (IA):(IB):(IC2+II) is from about 1:0.25:0.65 to about 1:0.75:0.3;
(ii) the combined equivalents of components (IB), (IC2) and (II) per epoxide equivalent in component (IA) is from about 0.9:1 to about 1.05:1; and
(iii) components (IC1) and (III) are present in a combined quantity which provides from about 0.0005 to about 0.05 mole of catalyst per epoxide equivalent in component (IA).

24. A laminating varnish of claim 23 wherein
(i) component (C1) is a quaternary phosphonium or ammonium compound, an imidazole or a combination thereof; and
(ii) component (II) is selected from amines, mercaptans, carboxylic acids, carboxylic acid anhydrides, guanidines, aromatic sulfonic acid amides, imidazoles or a combination thereof.

25. A laminating varnish of claim 24 wherein
(i) component (C1) is the product resulting from a mixture of a quaternary phosphonium acetate.acetic acid complex and fluoboric acid in a respective molar ratio of from about 1:0.9 to about 1:1.2, 2-methylimidazole or a combination thereof; and
(ii) component (II) is sulfanilamide, methylene dianiline, triethylenetetramine, diaminocyclohexane, 4-aminosalicylic acid, 2-methylimidazole, dicyandiamide, 4,4'-diaminodiphenylsulfone or a combination thereof.

26. The product resulting from B-staging a substrate which has been impregnated or coated with a laminating varnish of claim 21.

27. The product resulting from B-staging a substrate which has been impregnated or coated with a laminating varnish of claim 22.

28. The product resulting from B-staging a substrate which has been impregnated or coated with a laminating varnish of claim 23.

29. The product resulting from B-staging a substrate which has been impregnated or coated with a laminating varnish of claim 24.

30. The product resulting from B-staging a substrate which has been impregnated or coated with a laminating varnish of claim 25.

31. A laminate or composite resulting from curing one or more plies of claim 26.

32. A laminate or composite resulting from curing one or more plies of claim 27.

33. A laminate or composite resulting from curing one or more plies of claim 28.

34. A laminate or composite resulting from curing one or more plies of claim 29.

35. A laminate or composite resulting from curing one or more plies of claim 30.

36. A solvent free, partially advanced, epoxy resin composition comprising a product resulting from reacting a composition comprising
(A) at least one relatively low equivalent weight epoxy resin having an average of more than one vicinal epoxy group per molecule;
(B) at least one extender material having an average of about two active hydrogen atoms per molecule which are reactive with vicinal epoxy groups;
(C)
(1) optionally, one or more catalysts for promoting the reaction between components (A) and (B);
(2) one or more epoxy resin curing agents selected from the group consisting of amines, mercaptans, carboxylic acids, carboxylic acid anhydrides, aromatic sulfonic acid amides and imidazoles; or
(3) a combination of (1) and (2); and
(D) optionally, one or more stabilizer materials; wherein
(i) components (A), (B), (C) and (D) are present in quantities which provide from about 0.1 to about 0.9 active hydrogen equivalent in component (B) per epoxide equivalent in component (A); from about 0.05 to about 0.9 equivalent of component (C2) per epoxide equivalent in component (A) and the combined equivalents of components (B) and (C2) per epoxide equivalent in component (A) is from about 0.15:1 to about 1.1:1; from about zero to about 0.1 mole of component (C1) per epoxide equivalent in component (A); and component (D), when present, is present in a quantity which is sufficient to reduce the viscosity increase of the resultant partially advanced epoxy resin composition during storage; and
(ii) the composition is partially advanced to the extent that the melt viscosity has increased to a value which is at least about 1250 percent greater than the melt viscosity of the initial mixture of components (A), (B), (C) and (D); with the proviso that said partially advanced composition is melt flowable at or below about 250° C.

37. A solvent free, partially advanced, epoxy resin of claim 36 wherein (i) component (A) is a polyglycidyl ether of a polyhydric aromatic compound;

(ii) component (B) is selected from phthaleins, sulfonphthaleins, or xanthenes having at least two hydroxyl groups per molecule; those materials represented by formulas (I), (II) or (III) in the specification or a combination thereof; and (iii) components (A), (B), (C) and (D) are present in quantities which provide from about 0.15 to about 0.85 active hydrogen equivalent in component (B) per epoxide equivalent in component (A); from about 0.00005 to about 0.05 mole of component (C1) per epoxide equivalent in component (A); from about 0.05 to about 0.75 equivalent of component (C2) per epoxide equivalent in component (A); the combined equivalents of components (B) and (C2) per epoxide equivalent in component (A) is from about 0.2:1 to about 1.05:1; and from about 0.0001 to about 0.01 mole of component (D) per epoxide equivalent in component (A).

38. A solvent free, partially advanced, epoxy resin composition of claim 37 wherein (i) component (A) is selected from those compounds represented by formulas (IV), (V), (VI) or (VII) in the specification, diglycidyl ethers of phthaleins, sulfonphthaleins or xanthanes or a combination thereof;

(ii) components (A) and (B) are employed in quantities which provide from about 0.25 to about 0.75 active hydrogen equivalent per epoxide equivalent;

(iii) component (C1) is a quaternary phosphonium or ammonium compound, an imidazole or a combination thereof and is employed in an amount of from about 0.0001 to about 0.03 mole per epoxide equivalent in component (A);

(iv) component (C2) is selected from amines, aromatic sulfonic acid amides, imidazoles or a combination thereof and is present in a quantity of from about 0.075 to about 0.75 equivalents per epoxide equivalent in component (A);

(v) the combined equivalents of components (B) and (C2) per epoxide equivalent in component (A) is from about 0.325 to about 1:1; and (vi) component (D) is selected from organic or inorganic acids, salts or esters of organic and inorganic acids or a combination thereof and is present in a quantity which provides from about zero to about 0.005 mole per epoxide equivalent in component (A).

39. A solvent free, partially advanced epoxy resin composition of claim 38 wherein (i) component (A) is a diglycidyl ether of bisphenol A, bisphenol S, bisphenol K, tetrabromobisphenol A, phenolphthalein, 3,5,3',5'-tetramethyl-2,6,2',6'-tetrabromo-4,4'-dihydroxybiphenyl, tetramethyltribromodihydroxybiphenyl, the triglycidyl ether of tris(hydroxyphenyl)methane, or a combination thereof;

(ii) component (B) is tetrabromobisphenol A, bisphenol A, bisphenol K, bisphenol S, 3,5,3',5'-tetramethyl-2,6,2',6'-tetrabromo-4,4'-dihydroxybiphenyl, dimethylhydantoin, tetramethyltribromodihydroxybiphenyl, tetramethylbisphenol K, tetrabromobisphenol K or a combination thereof;

(iii) component (C2) is sulfanilamide, methylene dianiline, triethylenetetramine, diaminocyclohexane, 4-aminosalicyclic acid, 2-methylimidazole, 4,4'-diaminodiphenylsulfone or a combination thereof; and (iv) component (D) is p-toluene sulfonic acid, benzene sulfonic acid, methyl p-toluene sulfonate, ammonium perchlorate, fluoboric acid, perchloric acid, nitric acid or a combination thereof.

40. A solvent free, partially advanced, epoxy resin of claim 39 wherein (i) component (A) is a diglycidyl ether of bisphenol A having an average epoxide equivalent weight of from about 170 to about 300;

(ii) component (B) is bisphenol A, tetramethyltribromodihydroxybiphenyl or tetrabromobisphenol A;

(iii) component (C) is a mixture of components (C1) and (C2);

(iv) component (C1) is the product resulting from a mixture of a quaternary phosphonium acetate acetic.acid complex and a stoichiometric amount of fluoboric acid or 2-methylimidazole or a combination thereof;

(v) component (C2) is sulfanilamide, 4,4'-diaminodiphenylsulfone, or a combination thereof; and (vi) component (D), when present, is methyl p-toluenesulfonate, fluoboric acid or a combination thereof.

41. A powder coating composition comprising (I) a solvent free, partially advanced, epoxy resin of claims 36, 37, 38, 39 or 40;

(II) at least one curing agent therefor; and (III) optionally, a catalytic quantity of one or more catalysts for effecting the reaction between components (IA) and (IB); and wherein the components are employed in an equivalent ratio of (IA):(IB):(IC2+II) of from about 1:0.1:0.5 to about 1:0.9:0.2; the combined equivalents of components (IB), (IC2) and (II) per epoxide equivalent in component (IA) is from about 0.6:1 to about 1.1:1 and the combined quantity of components (IC1) and (III) is that which provides from about zero to about 0.2 mole of catalyst per epoxide equivalent in component (IA).

42. A powder coating composition of claim 41 wherein (i) the equivalent ratio of components (IA):(IB):(IC2+II) is from about 1:0.15:0.7 to about 1:0.85:0.2;

(ii) the combined equivalents of components (IB), (IC2) and (II) per epoxide equivalent in component (IA) is from about 0.85:1 to about 1.05:1, and (iii) components (IC1) and (III) are present in a combined quantity which provides from about 0.0001 to about 0.1 mole of catalyst per epoxide equivalent in component (IA).

43. A powder coating composition of claim 42 wherein (i) the equivalent ratio of components (IA):(IB):(IC2+II) is from about 1:0.25:0.65 to about 1:0.75:0.3;

(ii) the combined equivalents of components (IB), (IC2) and (II) per epoxide equivalent in component (IA) is from about 0.9:1 to about 1.05:1; and (iii) components (IC1) and (III) are present in a combined quantity which provides from about 0.0005 to about 0.05 mole of catalyst per epoxide equivalent in component (IA).

44. A powder coating composition of claim 43 wherein (i) component (II) is selected from amines, mercaptans, carboxylic acids, carboxylic acid anhydrides, guanidines, aromatic sulfonic acid amides, imidazoles or a combination thereof; and (ii) component (III) is a quaternary phosphonium or ammonium compound, an imidazole or a combination thereof.

45. A powder coating composition of claim 44 wherein (i) component (II) is sulfanilamide, methylene dianiline, triethylenetetramine, diaminocyclohexane, 4-aminosalicylic acid, 2-methylimidazole, dicyandiamide, 4,4'-diaminodiphenylsulfone or a combination thereof; and (ii) component (III) is the product resulting from a mixture of a quaternary phosphonium acetate.acetic acid complex and fluoboric acid in a respective molar ratio of from about 1:0.9 to about 1:1.2, 2-methylimidazole or a combination thereof.

46. A substrate coated with a cured powder coating of claim 41.

47. A substrate coated with a cured powder coating of claim 42.

48. A substrate coated with a cured powder coating of claim 43.

49. A substrate coated with a cured powder coating of claim 44.

50. A substrate coated with a cured powder coating of claim 45.

51. A partially advanced epoxy resin composition comprising a product resulting from reacting a composition comprising (A) at least one relatively low equivalent weight epoxy resin having an average of more than one vicinal epoxy group per molecule;

(B) at least one extender material having an average of about two active hydrogen atoms per molecule which are reactive with vicinal epoxy groups;

(C)
(1) optionally, one or more catalysts for promoting the reaction between components (A) and (B);
(2) one or more epoxy resin curing agents selected from the group consisting of amines, mercaptans, carboxylic acids, carboxylic acid anhydrides, aromatic sulfonic acid amides and imidazoles; or
(3) a combination of (1) and (2);

(D) one or more solvents; and (E) optionally, one or more stabilizer materials; wherein (i) components (A), (B), (C), (D) and (E) are present in quantities which provide from about 0.1 to about 0.9 active hydrogen equivalent in component (B) per epoxide equivalent in component (A); from about 0.05 to about 0.9 equivalent of component (C2) per epoxide equivalent in component (A); from about zero to about 0.1 mole of component (C1) per epoxide equivalent in component (A); the combined equivalents of components (B) and (C2) per epoxide equivalent in component (A) is from about 0.15:1 to about 1.1:1; component (D) is present in a quantity of from about 5 to about 90 percent by weight of the combined weight of components (A), (B), (C) and (D); and component (E) when present, is present in a quantity which is sufficient to reduce the viscosity increase of the resultant partially advanced epoxy resin composition during storage; and (ii) the composition is partially advanced to the extent that the melt viscosity has increased to a value which is greater than about 20 percent greater than the melt viscosity of the initial mixture of components (A), (B) and (C) with the proviso that reacted components (A), (B) and (C) of said partially advanced composition is soluble in component (D).

52. A partially advanced epoxy resin of claim 51 wherein (i) component (A) is a polyglycidyl ether of a polyhydric aromatic compound;

(ii) component (B) is selected from phthaleins, sulfonphthaleins, or xanthenes having at least two hydroxyl groups per molecule; those materials represented by formulas (I), (II) or (III) in the specification or a combination thereof;

(iii) components (A), (B), (C) and (D) are present in quantities which provide from about 0.15 to about 0.85 active hydrogen equivalent in component (B) per epoxide equivalent in component (A); from about 0.0005 to about 0.05 mole of component (C1) per epoxide equivalent in component (A); from about 0.05 to about 0.75 equivalent of component (C2) per epoxide equivalent in component (A); the combined equivalents of components (B) and (C2) per epoxide equivalent in component (A) is from about 0.2:1 to about 1.05:1; and from about 10 to about 40 percent by weight of component (D) based upon the combined weight of components (A), (B), (C) and (D); and (iv) the composition is partially advanced to the extent that the melt viscosity has advanced to a value of from about 25 to about 625 percent greater than the melt viscosity of the initial mixture of components (A), (B), (C), (D) and (E).

53. A partially advanced epoxy resin composition of claim 52 wherein (i) component (A) is selected from those compounds represented by formulas (IV), (V), (VI) or (VII) in the specification, diglycidyl ethers of phthaleins, sulfonphthaleins or xanthanes or a combination thereof;

(ii) components (A) and (B) are employed in quantities which provide from about 0.25 to about 0.75 active hydrogen equivalent per epoxide equivalent;

(iii) component (C1) is a quaternary phosphonium or ammonium compound, an imidazole or a combination thereof and is employed in an amount of from about 0.0001 to about 0.03 mole per epoxide equivalent in component (A);

(iv) component (C2) is selected from amines, aromatic sulfonic acid amides, imidazoles or a combination thereof and is present in quantity of from about 0.075 to about 0.75 equivalents per epoxide equivalent in component (A);

(v) the combined equivalents of components (B) and (C2) per epoxide equivalent in component (A) is from about 0.325:1 to about 1:1;

(vi) component (D) is selected from ketones, alcohols, glycol ethers, aromatic and aliphatic hydrocarbons, cyclic ethers, halogenated hydrocarbons, nitro-substituted hydrocarbons, amides or a combination thereof; and (vii) the composition is partially advanced to the extent that the melt viscosity has advanced to a value of from about 50 to about 300 percent greater than the melt viscosity of the initial mixture of components (A), (B), (C), (D) and (E).

54. A partially advanced epoxy resin composition of claim 53 wherein (i) component (A) is a diglycidyl ether of bisphenol A, bisphenol S, bisphenol K, tetrabromobisphenol A, phenolphthalein, 3,5,3',5'-tetramethyl-2,6,2',6'-tetrabromo-4,4'-dihydroxybiphenyl, tetramethyltribromodihydroxybiphenyl, the triglycidyl ether of tris(hydroxyphenyl)methane, or a combination thereof;

(ii) component (B) is tetrabromobisphenol A, bisphenol A, bisphenol K, bisphenol S, 3,5,3',5'-tetramethyl-2,6,2',6'-tetrabromo-4,4'-dihydroxybiphenyl, dimethylhydantoin, tetramethyltribromodihydroxybiphenyl, tetramethylbisphenol K, tetrabromobisphenol K or a combination thereof;

(iii) component (C2) is sulfanilamide, methylene dianiline, triethylenetetramine, diaminocyclohexane, 4-aminosalicyclic acid, 2-methylimidazole, 4,4'-diaminodiphenylsulfone or a combination thereof; and (iv) component (D) is acetone, methyl ethyl ketone, methyl isobutyl ketone, methyl amyl ketone, propylene glycol monomethyl ether, dipropylene glycol monomethyl ether, ethylene glycol monobutyl ether, methylene chloride, chloroform, 2-nitropropane or a combination thereof.

55. A partially advanced epoxy resin of claim 54 wherein (i) component (A) is a diglycidyl ether of bisphenol A having an average epoxide equivalent weight of from about 170 to about 300;

(ii) component (B) is bisphenol A, tetramethyltribromodihydroxybiphenyl or tetrabromobisphenol A;

(iii) component (C) is a mixture of components (C1) and (C2);

(iv) component (C1) is the product resulting from a mixture of a quaternary phosphonium acetate.acetic acid complex and fluoboric acid in a respective molar ratio of from about 1:0.9 to about 1:1.25, 2-methylimidazole or a combination thereof;

(v) component (C2) is sulfanilamide, 4,4'-diaminodiphenylsulfone, or a combination thereof; and (vi) component (D) is acetone, methyl ethyl ketone, methyl isobutyl ketone, methylene chloride or combination thereof.

56. A partially advanced epoxy resin of claim 51 wherein (i) component (A) is a polyglycidyl ether of a polyhydric aromatic compound;

(ii) component (B) is selected from phthaleins, sulfonphthaleins, or xanthenes having at least two hydroxyl groups per molecule; those materials represented by formulas (I), (II) or (III) in the specification or a combination thereof;

(iii) components (A), (B), (C) and (D) are present in quantities which provide from about 0.15 to about 0.85 active hydrogen equivalent in component (B) per epoxide equivalent in component (A); from about 0.00005 to about 0.05 mole of component (C1) per epoxide equivalent in component (A); from about 0.05 to about 0.75 equivalent of component (C2) per epoxide equivalent in component (A); the combined equivalents of components (B) and (C2) per epoxide equivalent in component (A) is from about 0.2:1 to about 1.05:1; and from about 40 to about 80 percent by weight of component (D) based on the combined weight of components (A), (B), (C) and (D); and (iv) the composition is partially advanced to the extent that the melt viscosity has advanced to a value of from about 25 to about 625 percent greater than the melt viscosity of the initial mixture of components (A), (B), (C), (D) and (E).

57. A partially advanced epoxy resin composition of claim 56 wherein (i) component (A) is selected from those compounds represented by formulas (IV), (V), (VI) or (VII) in the specification, diglycidyl ethers or phthaleins, sulfonphthaleins or xanthanes or a combination thereof;

(ii) components (A) and (B) are employed in quantities which provide from about 0.25 to about 0.75 active hydrogen equivalent per epoxide equivalent;

(iii) component (C1) is a quaternary phosphonium or ammonium compound, an imidazole or a combination thereof and is employed in an amount of from about 0.0001 to about 0.03 mole per epoxide equivalent in component (A);

(iv) component (C2) is selected from amines, mercaptans, carboxylic acids, carboxylic acid anhydrides, guanidines, aromatic sulfonic acid amides, imidazoles or a combination thereof and is present in a quantity of from about 0.075 to about 0.75 equivalents per epoxide equivalent in component (A);

(v) the combined equivalents of components (B) and (C2) per epoxide equivalent in component (A) is from about 0.325:1 to about 1:1;

(vi) component (D) is selected from ketones, alcohols, glycol ethers, aromatic and aliphatic hydrocarbons, cyclic ethers, halogenated hydrocarbons, nitro-substituted hydrocarbons, amides or a combination thereof; and (vii) the composition is partially advanced to the extent that the melt viscosity has advanced to a value of from about 50 to about 300 percent greater than the melt viscosity of the initial mixture of components (A), (B), (C), (D) and (E).

58. A partially advanced epoxy resin composition of claim 57 wherein (i) component (A) is a diglycidyl ether of bisphenol A, bisphenol S, bisphenol K, tetrabromobisphenol A, phenolphthalein, 3,5,3',5'-tetramethyl-2,6,2',6'-tetrabromo-4,4'-dihydroxybiphenyl, tetramethyltribromohydroxybiphenyl, the triglycidyl ether of tris(hydroxyphenyl)methane, or a combination thereof;

(ii) component (B) is tetrabromobisphenol A, bisphenol A, bisphenol K, bisphenol S, 3,5,3',5'-tetramethyl-2,6,2',6'-tetrabromo-4,4'-dihydroxybiphenyl, dimethylhydantoin, tetramethyltribromodihydroxybiphenyl, tetramethylbisphenol K, tetrabromobisphenol K or a combination thereof;

(iii) component (C2) is sulfanilamide, methylene dianiline, triethylenetetramine, diaminocyclohexane, 4-aminosalicyclic acid, 2-methylimidazole, dicyandiamide, 4,4'-diaminodiphenylsulfone or a combination thereof; and (iv) component (D) is acetone, methyl ethyl ketone, methyl isobutyl ketone, methyl amyl ketone, propylene glycol monomethyl ether, dipropylene glycol monomethyl ether, ethylene glycol monobutyl ether, methylene chloride, chloroform, 2-nitropropane or a combination thereof.

59. A partially advanced epoxy resin of claim 58 wherein (i) component (A) is a diglycidyl ether of bisphenol A having an average epoxide equivalent weight of from about 170 to about 300;

(ii) component (B) is bisphenol A, tetramethyltribromodihydroxybiphenyl or tetrabromobisphenol A;

(iii) component (C) is a mixture of components (C1) and (C2);

(iv) component (C1) is the product resulting from a mixture of a quaternary phosphonium acetate.acetic acid complex and fluoboric acid in a respective molar ratio of from about 1:0.9 to about 1:1.25, 2-methylimidazole or a combination thereof;

(v) component (C2) is sulfanilamide, 4,4'-diaminodiphenylsulfone, or a combination thereof; and (vi) component (D) is acetone, methyl ethyl ketone, methyl isobutyl ketone, methylene chloride or a combination thereof.

60. A product resulting from reacting and curing a composition comprising a mixture of (I) a partially advanced epoxy resin of claims 51, 52, 53, 54, 55, 56, 57, 58 or 59;

(II) at least one curing agent therefor; and (III) optionally, a catalytic quantity of one or more catalysts for effecting the reaction between components (IA) and (IB); and wherein the components are employed in a equivalent ratio of (IA):(IB):(IC2+II) of from about 1:0.1:0.5 to about 1:0.9:0.2; the combined equivalents of components (IB), (IC2) and (II) per epoxide equivalent in component (IA) is from about 0.6:1 to about 1.1:1 and the combined quantity of components (IC1) and (III) is that which provides from about zero to about 0.2 mole of catalyst per epoxide equivalent in component (IA).

61. A product of claim 60 wherein (i) the eqivalent ratio of components (IA):(IB):(IC2+II) is from about 1:0.15:0.7 to about 1:0.85:0.2;

(ii) the combined equivalents of components (IB), (IC2) and (II) per epoxide equivalent in component (IA) is from about 0.85:1 to about 1.05:1; and (iii) components (IC1) and (III) are present in a combined quantity which provides from about 0.0001 to about 0.1 mole of catalyst per epoxide equivalent in component (IA).

62. A product of claim 61 wherein (i) the equivalent ratio of components (IA):(IB):(IC2+II) is from about 1:0.25:0.65 to about 1:0.75:0.3;

(ii) the combined equivalents of components (IB), (IC2) and (II) per epoxide equivalent in component (IA) is from about 0.9:1 to about 1.05:1; and (iii) components (IC1) and (III) are present in a combined quantity which provides from about 0.0005 to about 0.05 mole of catalyst per epoxide equivalent in component (IA).

63. A product of claim 62 wherein (i) component (C1) is a quaternary phosphonium or ammonium compound, an imidazole or a combination thereof; and (ii) component (II) is selected from amines, mercaptans, carboxylic acids, carboxylic acid anhydrides, guanidines, aromatic sulfonic acid amides, imidazoles or a combination thereof.

64. A product of claim 63 wherein (i) component (C1) is the product resulting from a mixture of a quaternary phosphonium acetate.acetic acid complex and fluoboric acid in a respective molar ratio of from about 1:0.9 to about 1:1.25, 2-methylimidazole or a combination thereof; and (ii) component (II) is sulfanilamide, methylene dianiline, triethylenetetramine, diaminocyclohexane, 4-aminosalicylic acid, 2-methylimidazole, dicyandiamide, 4,4'-diaminodiphenylsulfone or a combination thereof.

65. A product of claim 60 which is a structural or an electrical laminate or composite.

66. A product of claim 61 which is a structural or an electrical laminate or composite.

67. A product of claim 62 which is a structural or an electrical laminate or composite.

68. A product of claim 63 which is a structural or an electrical laminate or composite.

69. A product of claim 64 which is a structural or an electrical laminate or composite.

70. A product of claim 60 which is a coating, casting, adhesive, encapsulated article or molded article.

71. A product of claim 61 which is a coating, casting, adhesive, encapsulated article or molded article.

72. A product of claim 62 which is a coating, casting, adhesive, encapsulated article or molded article.

73. A product of claim 63 which is a coating, casting, adhesive, encapsulated article or molded article.

74. A product of claim 64 which is a coating, casting, adhesive, encapsulated article or molded article.

75. A solvent free, partially advanced, epoxy resin composition comprising a product resulting from reacting a composition comprising (A) at least one relatively low equivalent weight epoxy resin having an average of more than one vicinal epoxy group per molecule;

(B) at least one extender material having an average of about two active hydrogen atoms per molecule which are reactive with vicinal epoxy groups;

(C) a least one of (1) one or more catalysts for promoting the reaction between components (A) and (B);

(2) one or more epoxy resin curing agents selected from the group consisting of amines, mercaptans, carboxylic acids, carboxylic acid anhydrides, aromatic sulfonic acid amides and imidazoles; or (3) a combination of (1) and (2); and (D) optionally, one or more stabilizer materials; wherein (i) components (A), (B), (C) and (D) are present in quantities which provide from about 0.1 to about 0.9 active hydrogen equivalent in component (B) per epoxide equivalent in component (A); from about 0.05 to about 0.9 equivalent of component (C2) per epoxide equivalent in component (A) and the combined equivalents of components (B) and (C2) per epoxide equivalent in component (A) is from about 0.15:1 to about 1.1:1; from about zero to about 0.1 mole of component (C1) per epoxide equivalent in component (A); and component (D), when present, is present in a quantity which is sufficient to reduce the viscosity increase of the resultant partially advanced epoxy resin composition during storage; and (ii) the composition is partially advanced to the extent that the melt viscosity has increased to a value which is from about 20 to about 1250 percent greater than the melt viscosity of the initial mixture of components (A), (B), (C) and (D).

76. A solvent free, partially advanced, epoxy resin of claim 75 wherein (i) component (A) is a polyglycidyl ether of a polyhydric aromatic compound;
(ii) component (B) is selected from phthaleins, sulfonphthaleins, or xanthenes having at least two hydroxyl groups per molecule; those materials represented by formulas (I), (II) or (III) in the specification or a combination thereof;
(iii) components (A), (B), (C) and (D) are present in quantities which provide from about 0.15 to about 0.85 active hydrogen equivalent in component (B) per epoxide equivalent in component (A); from about 0.00005 to about 0.05 mole of component (C1) per epoxide equivalent in component (A); from about 0.05 to about 0.75 equivalent of component (C2) per epoxide equivalent in component (A); the combined equivalents of components (B) and (C2) per epoxide equivalent in component (A) is from about 0.2:1 to about 1.05:1; and from about zero to about 0.01 mole of component (D) per epoxide equivalent in component (A); and
(iv) the composition is partially advanced to the extent that the melt viscosity has increased to a value of from about 25 to about 625 percent greater than the melt viscosity of the initial mixture of components (A), (B), (C) and (D).

77. A solvent free, partially advanced, epoxy resin composition of claim 76 wherein
(i) component (A) is selected from those compounds represented by formulas (IV), (V), (VI) or (VII) in the specification, diglycidyl ethers of phthaleins, sulfonphthaleins or xanthanes or a combination thereof;
(ii) components (A) and (B) are employed in quantities which provide from about 0.25 to about 0.75 active hydrogen equivalent per epoxide equivalent;
(iii) component (C1) is a quaternary phosphonium or ammonium compound, an imidazole or a combination thereof and is employed in an amount of from about 0.0001 to about 0.03 mole per epoxide equivalent in component (A);
(iv) component (C2) is selected from amines, aromatic sulfonic acid amides or a combination thereof and is present in a quantity of from about 0.075 to about 0.75 equivalents per epoxide equivalent in component (A);
(v) the combined equivalents of components (B) and (C2) per epoxide equivalent in component (A) is from about 0.325 to about 1:1;
(vi) component (D) is selected from organic or inorganic acids, salts or esters of organic and inorganic acids or a combination thereof and is present in a quantity which provides from about zero to about 0.005 mole per epoxide equivalent in component (A); and
(vii) the composition is partially advanced to the extent that the melt viscosity has increased to a value of from about 50 to about 300 percent greater than the melt viscosity of the initial mixture of components (A), (B), (C) and (D).

78. A solvent free, partially advanced, epoxy resin composition of claim 77 wherein
(i) component (A) is a diglycidyl ether of bisphenol A, bisphenol S, bisphenol K, tetrabromobisphenol A, phenolphthalein, 3,5,3′,5′-tetramethyl-2,6,2′,6′-tetrabromo-4,4′-dihydroxybiphenyl, tetramethyl- tribromodihydroxybiphenyl, the triglycidyl ether of tris(hydroxyphenyl)methane, or a combination thereof;

(ii) component (B) is tetrabromobisphenol A, bisphenol A, bisphenol K, bisphenol S, 3,5,3′,5′-tetramethyl-2,6,2′,6′-tetrabromo-4,4′-dihydroxybiphenyl, dimethylhydantion, tetramethyl tribromodihydroxybiphenyl, tetramethylbisphenol K, tetrabromobisphenol S or a combination thereof;
(iii) component (C2) is sulfanilamide, methylene dianiline, triethylenetetramine, diaminocyclohexane, 4-aminosalicylic acid, 4,4′-diaminodiphenylsulfone or a combination thereof; and
(iv) component (D), when present, is p-toluene sulfonic acid, benzene sulfonic acid, methyl p-toluene sulfonate, ammonium perchlorate, fluoboric acid, perchloric acid, nitric acid or a combination thereof.

79. A solvent free, partially advanced, epoxy resin composition of claim 78 wherein
(i) component (A) is a diglycidyl ether of bisphenol A having an average epoxide equivalent weight of from about 170 to about 300;
(ii) component (B) is bisphenol A, tetrabromobisphenol A or tetramethyl tribromodihydroxybiphenyl;
(iii) component (C) is a mixture of components (C1) and (C2);
(iv) component (C1) is the product resulting from a mixture of a quaternary phosphonium acetate.acetic acid complex and a stoichiometric amount of fluoboric acid or 2-methylimidazole or a combination thereof;
(v) component (C2) is sulfanilamide, 4,4′-diaminodiphenylsulfone, or a combination thereof; and
(vi) component (D), when present, is methyl p-toluenesulfonate, fluoboric acid or a combination thereof.

80. A product resulting from reacting and curing a composition comprising a mixture of
(I) a partially advanced epoxy resin of claims 75, 76, 77, 78 or 79;
(II) at least one curing agent therefor; and
(III) optionally, a catalytic quantity of one or more catalysts for effecting the reaction between components (IA) and (IB); and
wherein the components are employed in an equivalent ratio of (IA):(IB):(IC2+II) of from about 1:0.1:0.5 to about 1:0.9:0.2; the combined equivalents of components (IB), (IC2) and (II) per epoxide equivalent in component (IA) is from about 0.6:1 to about 1.1:1 and the combined quantity of components (IC1) and (III) is that which provides from about zero to about 0.2 mole of catalyst per epoxide equivalent in component (IA).

81. A product of claim 80 wherein
(i) the equivalent ratio of components (IA):(IB):(IC2+II) is from about 1:0.15:0.7 to about 1:0.85:0.2;
(ii) the combined equivalents of components (IB), (IC2) and (II) per epoxide equivalent in component (IA) is from about 0.85:1 to about 1.05:1; and
(iii) components (IC1) and (III) are present in a combined quantity which provides from about 0.0001 to about 0.1 mole of catalyst per epoxide equivalent in component (IA).

82. A product of claim 81 wherein
(i) the equivalent ratio of components (IA):(IB):(IC2+II) is from about 1:0.25:0.65 to about 1:0.75:0.3;

(ii) the combined equivalents of components (IB), (IC2) and (II) per epoxide equivalent in component (IA) is from about 0.9:1 to about 1.05:1; and (iii) components (IC1) and (III) are present in a combined quantity which provides from about 0.0005 to about 0.05 mole of catalyst per epoxide equivalent in component (IA).

83. A product of claim 82 wherein
(i) component (C1) is a quaternary phosphonium or ammonium compound, an imidazole or a combination thereof; and
(ii) component (II) is selected from amines, mercaptans, carboxylic acids, carboxylic acid anhydrides, guanidines, aromatic sulfonic acid amides, imidazoles or a combination thereof.

84. A product of claim 83 wherein
(i) component (C1) is the product resulting from a mixture of a quaternary phosphonium acetate.acetic acid complex and fluoboric acid in a respective molar ratio of from about 1:0.9 to about 1:1.25, 2-methylimidazole or a combination thereof; and
(ii) component (II) is sulfanilamide, methylene dianiline, triethylenetetramine, diaminocyclohexane, 4-aminosalicylic acid, 2-methylimidazole, dicyandiamide, 4,4'-diaminodiphenylsulfone or a combination thereof.

85. A product of claim 80 which is a structural or an electrical laminate or composite.

86. A product of claim 81 which is a structural or an electrical laminate or composite.

87. A product of claim 82 which is a structural or an electrical laminate or composite.

88. A product of claim 83 which is a structural or an electrical laminate or composite.

89. A product of claim 84 which is a structural or an electrical laminate or composite.

90. A product of claim 80 which is a coating, casting, adhesive, encapsulated article or molded article.

91. A product of claim 81 which is a coating, casting, adhesive, encapsulated article or molded article.

92. A product of claim 82 which is a coating, casting, adhesive, encapsulated article or molded article.

93. A product of claim 83 which is a coating, casting, adhesive, encapsulated article or molded article.

94. A product of claim 84 which is a coating, casting, adhesive, encapsulated article or molded article.

* * * * *